United States Patent
Takahashi et al.

[11] Patent Number: 6,077,800
[45] Date of Patent: Jun. 20, 2000

[54] CERAMIC POROUS MEMBRANE, CERAMIC FILTER USING THE SAME, AND METHOD OF MANUFACTURING THE SAME

[75] Inventors: Tomonori Takahashi, Chita; Manabu Isomura, Tsushima, both of Japan

[73] Assignee: NGK Insulators, Ltd., Japan

[21] Appl. No.: 08/996,188

[22] Filed: Dec. 22, 1997

[30] Foreign Application Priority Data

Dec. 27, 1996 [JP] Japan .................................. 8-357772
Aug. 7, 1997 [JP] Japan .................................. 9-225839

[51] Int. Cl.$^7$ .................................................. C04B 38/00
[52] U.S. Cl. .................. 501/80; 210/510.1; 210/500.21; 210/500.25
[58] Field of Search ......................... 501/80; 210/500.21, 210/500.25, 510.1

[56] References Cited

U.S. PATENT DOCUMENTS

| | | | |
|---|---|---|---|
| 3,892,580 | 7/1975 | Messing | 501/80 |
| 4,265,659 | 5/1981 | Blome | 210/510 |
| 4,342,664 | 8/1982 | Blome | 501/127 |
| 4,983,423 | 1/1991 | Goldsmith | 427/230 |
| 5,030,351 | 7/1991 | Burggraaf et al. | 210/500.21 |
| 5,106,502 | 4/1992 | Goldsmith | 210/490 |
| 5,269,926 | 12/1993 | Webster et al. | 427/230 |

FOREIGN PATENT DOCUMENTS

| | | |
|---|---|---|
| 0 692 303 A2 | 1/1996 | European Pat. Off. . |
| 692303 A2 | 1/1996 | European Pat. Off. . |
| 0 692 303 A3 | 2/1996 | European Pat. Off. . |
| 692303 A3 | 2/1996 | European Pat. Off. . |
| 2 693 921-A1 | 1/1994 | France . |
| 2693921 | 1/1994 | France . |
| 63-274407 | 11/1988 | Japan . |
| WO 96/22829 | 8/1996 | WIPO . |

OTHER PUBLICATIONS

"Microstructure of $TiO_2$ Membranes Prepared by Destabilization of colloidal solution Process" Bae et al Hanguk Chaelyo Hakhoechi 6(4), p 357–63, 1996.

"Improvement of Thermal Stability of Porous Nanostructured Ceramic Membranes" Lin et al. Ind Eng. Chem Res. 33 147 p 860–70, 1994.

*Primary Examiner*—Paul Marcantoni
*Attorney, Agent, or Firm*—Parkhurst & Wendel, L.L.P.

[57] ABSTRACT

A ceramic porous membrane in which aggregate particles are bound by binding portions composed of a titania, is provided. The binding portions composed of a titania are contained in an amount of 1–30% by weight based on the aggregate particles, and the aggregate particles comprise an α-alumina. The porous membrane is formed on a porous substrate to form a ceramic filter. A slurry comprising aggregate particles and 1–70% by weight of binding portions composed of a titania based on the aggregate particles are prepared, and thermally treating the slurry at a temperature of 300–700° C. under ambient atmosphere to form the porous membrane.

6 Claims, 3 Drawing Sheets

} CERAMIC POROUS MEMBRANE

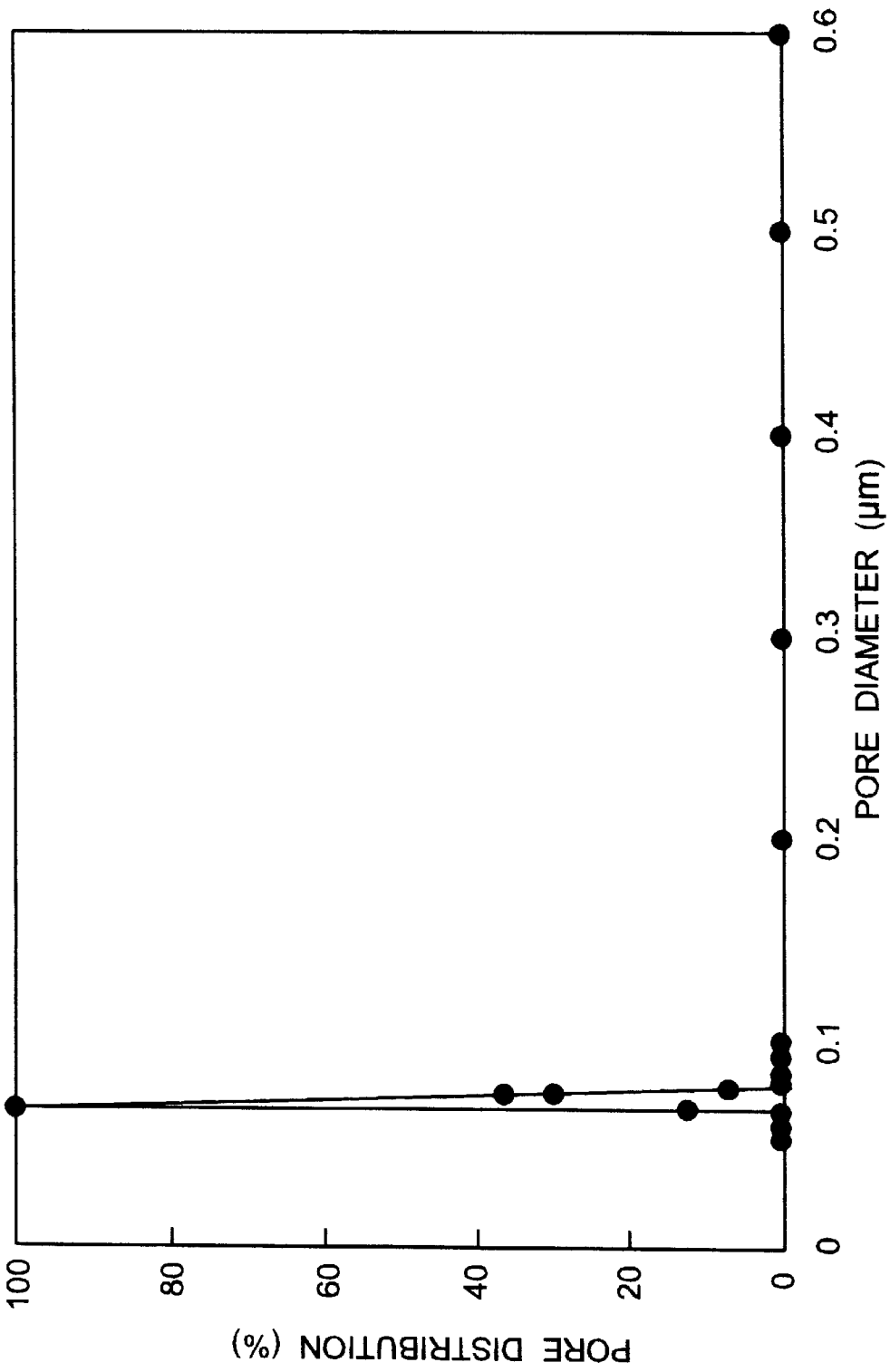

CERAMIC POROUS MEMBRANE, CERAMIC FILTER USING THE SAME, AND METHOD OF MANUFACTURING THE SAME

BACKGROUND OF THE INVENTION AND RELATED ART STATEMENT

The present invention relates to a ceramic porous membrane bound by a titania, a ceramic filter using the same, and a method of manufacturing the same.

In comparison with polymeric membranes, etc., a ceramic filter in which a porous membrane having pores of a smaller diameter is formed on the surface of a ceramic porous substrate, is useful as a filter, etc. for a solid-liquid separation in view of a high reliability due to its excellent physical properties and durability, in view of a very small deterioration even after cleaning by acids or alkalis due to its high corrosion resistance and, further, in view of being capable of precisely controlling a pore diameter upon which filtering ability depends.

In the ceramic filter described above, performance of a ceramic porous membrane upon which filtering ability depends and a manufacturing method thereof are technical points when manufacturing the ceramic filter.

In general, a ceramic porous membrane can be obtained by a process in which a slurry comprising ceramic particles is deposited on the surface of a substrate, and then fired at a high temperature of not less than 1,300° C. to thereby solid-phase sinter the ceramic particles with each other.

Further, Japanese Patent Application Laid-Open No. 63-274407 discloses a method of manufacturing a ceramic porous membrane in which a slurry comprising ceramic particles constituting aggregate to which an inorganic sol such as alumina sol or silica sol is added, is deposited on the surface of a substrate before firing (so-called a raw substrate), and then co-fired at 1,200° C.

The former process can provide a porous membrane having an excellent strength and corrosion resistance owing to a strong binding by solid-phase sintering of the ceramic particles with each other. However, if firing is not effected at a high temperature of 1,300° C. or more, a porous membrane having a practicable strength can not be obtained.

Firing at such high temperatures requires a large amount of energy. A setter, etc. on which porous substrates are disposed, must be prepared by a special equipment requiring a high cost made by, for example, a refractory body such as a silicone carbide. In addition, heat resistance of not less than 1,300° C. is required also for the substrates. Accordingly, the material for the substrates unavoidably becomes expensive, resulting in increased product costs.

On the other hand, in the latter process, since firing takes place after forming a membrane by depositing a slurry on a raw substrate, ceramic sol is added to the raw substrate for ensuring handling strength. Further, ceramic sol is also added to a slurry constituting a membrane portion in order to synchronize a firing behavior of the substrate portion with that of the membrane portion.

Even in this method, although the temperature is somewhat lower in comparison with the former process, since firing at a high temperature of not less than 1,200° C., there is a problem accompanied by the firing at a high temperature.

Further, in the porous membrane prepared by the latter process, a portion of fine particles derived from inorganic sol is more sensitive against corrosion in comparison with aggregate particles. Accordingly, in the case where a silica sol is used, there is a problem because it is low in alkali resistance.

On the other hand, in the case where an alumina sol is used, if a sufficient firing is not effected at a high temperature of not less than 1,200° C., there is a problem as it is low in alkali resistance because γ-alumina is formed. Accordingly, a firing at a high temperature becomes essential.

SUMMARY OF THE INVENTION

The present invention has been made in view of the above-mentioned problems of the conventional technique, and therefore an object of the invention is to provide a porous membrane having a practicable strength and corrosion resistance and a method of manufacturing the porous membrane under a low temperature condition where refractory facilities are not required.

According to the present invention, there is provided a ceramic porous membrane, wherein aggregate particles are bound by binding portions composed of a titania.

In the ceramic porous membrane of the present invention, it is preferred that the binding portions composed of a titania are contained in an amount of 1–30% by weight based on the aggregate particles, and that the aggregate particles comprise an α-alumina.

Further, according to the present invention, there is provided a ceramic filter, wherein the ceramic porous membrane is formed on the surface of a porous substrate.

According to the present invention, there is provided a method of manufacturing a ceramic porous membrane, comprising the steps of: (A) a first step of preparing a slurry comprising aggregate particles and 1–70% by weight of binding portions composed of a titania based on the aggregate particles; and (B) a second step of manufacturing a porous membrane by thermally treating the slurry at a temperature of 300–700° C. under ambient atmosphere.

Further, according to the invention, there is provided a method of manufacturing a ceramic filter, comprising the steps of: (A) a first step of preparing a slurry comprising aggregate particles and 1–70% by weight of binding portions composed of a titania based on the aggregate particles; (B) a second step of manufacturing a membrane body by depositing the slurry on the surface of a porous substrate; and (C) a third step of manufacturing a porous membrane on the surface of the porous substrate by thermally treating the membrane body at a temperature of 300–700° C. under ambient atmosphere.

Still further, according to the present invention, there is provided a method of manufacturing a ceramic porous membrane, comprising the steps of: (A) a first step of preparing a slurry comprising aggregate particles and 1–70% by weight of binding portions composed of a titania based on the aggregate particles; and (B) a second step of manufacturing a porous membrane by thermally treating the slurry at a temperature of 100–300° C. under aqueous vapor atmosphere.

Yet further, according to the present invention, there is provided a method of manufacturing a ceramic porous membrane, comprising the steps of: (A) a first step of preparing a slurry comprising aggregate particles and 1–70% by weight of binding portions composed of a titania based on the aggregate particles; (B) a second step of manufacturing a membrane body by depositing the slurry on the surface of a porous substrate; and (C) a third step of manufacturing a porous membrane by thermally treating the membrane body at a temperature of 100–300° C. under aqueous vapor atmosphere.

BRIEF DESCRIPTION OF THE DRAWINGS

In the accompanying drawings:

FIG. 4 is a graph showing a pore diameter distribution of the porous membrane of the filter of Example 11 of the present invention.

PREFERRED EMBODIMENTS OF THE INVENTION

Figure 1:
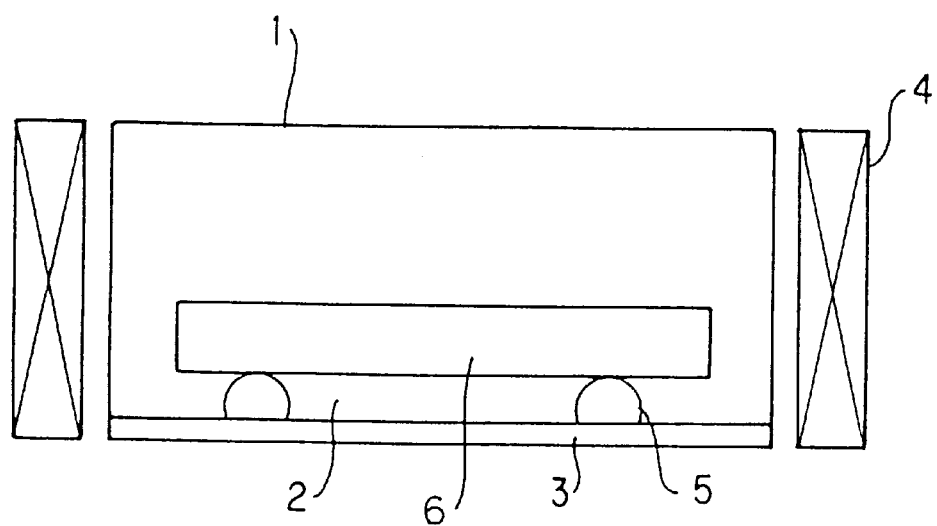
FIG. 1 is a cross-sectional view schematically showing an example of the process for thermally treating under aqueous vapor atmosphere.

First, detailed description will be made of a ceramic porous membrane of the present invention.

It should be noted that in the following descriptions, "pore diameter" and "particle diameter" mean "average pore diameter" and "average particle diameter", respectively.

In general, a ceramic porous membrane means a thin film composed of a ceramic porous body having a thickness of 0.5–500 µm or so.

For example, the ceramic porous membrane is used in the form of a ceramic filter in which a thin membrane is formed on the surface of a ceramic porous substrate, resulting in the essential portion of filtering function in the filter.

A ceramic porous membrane (hereinafter, referred to as a porous membrane) of the present invention does not have a conventional structure in which ceramic particles are bound with each other by solid-phase sintering, and it is featured that aggregate particles composed of ceramics are bound by a binding material composed of a titania ($TiO_2$).

The structure can be prepared at a relatively low temperature because it is not prepared through solid-phase sintering. In addition, since the binding material is composed of a titania having a high corrosion resistance, a porous membrane having a high corrosion resistance can be formed with respect to a binding portion which is usually sensitive to corrosion.

The aggregate particles in the present invention are composed of ceramic particles by which a skeleton of the porous membrane can be formed. Accordingly, the diameter of pore of the porous membrane is determined according to that of the aggregate particles, whereby the performance of the filter is determined.

In other words, a porous membrane having a desired pore diameter can be obtained by appropriately selecting the diameter of the aggregate particles.

The present invention is intended to provide a porous membrane having a diameter of 0.05–1 µm by using aggregate particles having a relatively small diameter of 0.1–3 µm.

As a material for the aggregate particles, if it is ceramics, it is not particularly limited. For example, there can be used an alumina ($Al_2O_3$), a titania, a mullite ($Al_2O_3$—$SiO_2$), a zirconia ($ZrO_2$), a silica ($SiO_2$), a spinel ($MgO$—$Al_2O_3$), and a mixture thereof. However, α-alumina is preferably used because of the reasons such as a raw material in which the particle diameter is controlled, can be readily obtained, a slurry is stable, a corrosion resistance can be promoted in the aggregate particles themselves, and a higher binding strength can be obtained owing to a titania.

The binding material in the present invention comprises micro (fine) particles for binding the aggregate particles with each other by which a skeleton of the porous membrane is formed, and is composed of a titania.

Corrosion resistance in the binding portion can be ensured by using the binding material composed of a titania, which is more sensitive to corrosion in comparison with the aggregate particles.

The binding material composed of a titania, if it consists essentially of a titania, is satisfactory. Specifically, if the content of a titania is not less than 50% by weight, it can be used. However, the content exceeding 80% by weight is more preferred in view of being capable of ensuring a high alkali resistance.

As the above-mentioned binding material, there can be used titania fine particles, specifically, for example, titania sol particles and titania finely-powdered particles (hereinafter, referred to as sol particles, finely-powdered particles).

The fine particles can form the binding portions by being strongly bound between fine particles and a fine particles, and between fine particles and the aggregate particles through a heat treatment.

It is to be noted that the fine particles may be crystallized or not after the heat treatment.

In the porous membrane, a ratio of the binding portions with respect to the aggregate particles should be suitably determined in consideration of a particle diameter of the aggregate particles. However, it is preferred that the solid content of the binding portion is about 1–30% by weight or so based on the aggregate particles.

If the binding portion is less than 1% by weight, the aggregate particles cannot be firmly bound. On the contrary, if it exceeds more than 30% by weight, pores formed by the aggregate particles are filled by the binding portion, whereby water permeability occasionally lowers.

Next, a ceramic filter of the present invention is illustrated.

In the ceramic filter (hereinafter, referred to as filter) of the present invention, the above-mentioned fine porous membrane of the present invention is formed on the surface of a porous substrate.

The porous substrate (hereinafter, referred to as substrate) in the present invention is a porous body composed of ceramics, by which an outer shape is formed in the filter.

However, since a function as a filter is mainly exhibited by the porous membrane formed on the surface of the substrate, as the substrate itself, a porous body having a relatively large pore diameter of 1–50 µm may be used.

The material for the substrate is not particularly limited, if it is a ceramics. For example, an alumina, a titania, a mullite, a zirconia, a mixture thereof, and the like may preferably be used.

Further, there may be also used a substrate in which a ceramic layer is formed in advance on the surface of a ceramic substrate.

On the surface of the substrate described above, the porous membrane is formed by a process described later to prepare the filter.

Finally, description will be made of a method of manufacturing a porous membrane of the present invention.

(Manufacturing method 1)

In the manufacturing method 1, a porous membrane is formed by thermally treating a slurry comprising a binding material composed of aggregate particles and a titania (that is, titania sol particles or titania finely-powdered particles) at a temperature of 300–700° C. under ambient atmosphere.

According to the manufacturing method, the porous membrane having a practicable strength may be prepared at a temperature where refractory facilities are not required.

Further, different from a treatment under aqueous vapor atmosphere described in a manufacturing method 2 which is described later, it has an advantage that a tunnel type furnace suitable for a mass production may be used without conducting a batch type thermal treatment.

First, the above-mentioned aggregate particles and sol particles, or finely-powdered particles are dispersed with water, and mixed to prepare a slurry for forming a membrane.

A method of manufacturing the sol particles is not particularly limited, and there may be also used a commercially available sol liquid having the solid content of 5–40% by weight. For example, a hydrolyzed sol of titanium isopropoxide "TR-20A" (trade name, manufactured by Nissan Chemical Industries Ltd.) may be used.

Also, as for the finely-powdered particles, there may be used, for example, "NanoTek ($TiO_2$)" (trade name, manufactured by C. I. Kasei Co, Ltd.].

Particle diameter of the sol particles or finely-powdered particles to be used in the present invention is preferably in a range of 5–100 nm.

If the particle diameter is less than 5 nm, the sol particles or finely-powdered particles cohere with each other, making it difficult to form an excellent porous membrane. On the other hand, if the particle diameter is more than 100 nm, binding ability becomes weak, making it difficult to firmly bind the aggregate particles.

In addition to the above, the particle diameter of the sol particles or finely-powdered particles is preferably adjusted to not more than ⅕, more preferably not more than ⅒ of the particle diameter of the aggregate particles.

Even if the sol particles or finely powdered particles having a particle diameter not less than ⅕ of the particle diameter of the aggregate particles is used, there is a fear that a function as a binding material could not be exhibited.

Although it depends upon the thickness of the membrane to be deposited, the concentration of the slurry is generally set to not more than 100% by weight. If the concentration of the slurry exceeds 100% by weight, there is a fear that a cohesion among the aggregate particles would occur to thereby defect the membrane.

Incidentally, an organic binder such as a poly(vinyl alcohol)(PVA) may be added into the slurry in order to improve membrane formability, and a pH adjusting agent, a surface active agent, or the like may also be added thereto in order to improve a dispersibility.

Subsequently, the above-mentioned slurry is thermally treated at a temperature condition of 300–700° C. under ambient atmosphere.

In case of less than 300° C., a firm binding portion cannot be formed among the aggregate particles, whereas in case of more than 700° C., the binding portions among the aggregate particles becomes firm. However, in addition to the fact that refractory facilities are required, a large amount of energy is required, resulting in that costs increase.

Although conditions for the thermal treatment other than temperature are not particularly limited, the above-mentioned tunnel type furnace is preferably used for the thermal treatment, which is suitable for a mass production.

Further, in case of manufacturing a filter, the above-mentioned thermal treatment may be effected after forming a membrane body by depositing the above-mentioned slurry on the surface of the ceramic porous substrate.

Although the method of manufacturing the membrane is not particularly limited, there can be used, for example, a method in which a membrane is formed by directly coating the slurry onto the surface of the porous substrate.
(Manufacturing method 2)

Also, the porous membrane of the present invention can be prepared by manufacturing method 2 which is illustrated hereinafter. In the manufacturing method 2, the porous membrane is formed by thermally treating the same slurry as in the manufacturing method 1 at a temperature of 100–300° C. under aqueous vapor (steam) atmosphere.

Also in this manufacturing method, the porous membrane having a practicable strength can be prepared at a temperature where refractory facilities are not required, as well as in manufacturing method 1.

The slurry may be prepared, as in manufacturing method 1, by thermally treating at a temperature condition of 100–300° C. under aqueous vapor atmosphere.

In case of less than 100° C., strength cannot be obtained in the membrane. In case of more than 300° C., the aggregate particles, for example, alumina particles excessively dissolve, resulting in that desired pores cannot be formed.

Example of the process for thermally treating under aqueous vapor atmosphere, for example, includes a process in which water 3 is supplied into a sealed vessel 1 such as an autoclave furnace in a volume based on vapor which exceeds a volume of the sealed vessel 1 as shown in FIG. 1, and it is heated by a heater 4 from outside.

According to the process, the inside of the sealed vessel 1 is changed to aqueous vapor atmosphere, and saturated vapor pressure is given, whereby, there can be prepared a porous membrane having a practicable strength.

It is to be noted that if the water 3 is added in an amount so that a membrane body 6 sinks in the case, there is a fear that a slurry deposited on the surface of the porous substrate is dissolved.

Hereinafter, although the present invention is illustrated in more detail with reference to examples of the present invention in which a porous membrane is formed on the surface of the porous substrate to prepare a filter, the present invention is not limited thereto.

Incidentally, raw materials and evaluation methods thereof are based on the conditions described later.
(1) Porous substrate There was used a substrate composed of an alumina which has a pore diameter (by an air-flow method described in ASTM F306, hereinafter, referred to as Air-flow method) of 0.5 μm, and which was prepared by depositing a slurry composed of alumina particles on the surface of one side of a plane porous body having a diameter of 22 mm, a thickness of 3 mm, and a pore diameter (a mercury injection method) of 10 μm, in a thickness of 100 μm.
(2) Aggregate particles, binding material Particle diameters of aggregate particles and a finely-powdered binding material were measured by a laser diffraction method, and particle diameter of sol particles as binding material was measured with a transmittable electronic microscope, in which an average value between a maximum diameter and a minimum diameter in each sol particle is regarded as a particle diameter of the particles, and an average value of particle diameters in 100 pieces of sol particles is determined and regarded as a particle diameter of the sol particles.
(3) Membrane body Water was added into aggregate particles and a binding material (sol particles or finely-powdered particles), followed by mixing. In all the examples and reference examples, the concentration was adjusted so that the thickness of the membrane is approximately 20 μm, followed by depositing on the surface of alumina membrane side of the substrate (1). After drying, it was used as a membrane body.
(4) Evaluation A pore diameter distribution and water permeability by a pure water were measured with respect to the filter of the examples of the present invention. The pore diameter distribution and water permeability are shown as an average pore diameter based on the Air flow method, and an amount of water permeated per a filtration area and 1 hour at pressure difference of 1 kg/cm$^2$ through a membrane and the temperature of 25° C., respectively.

Furthermore, Vickers hardness was measured in order to evaluate a strength of the porous membrane. Load is adjusted to 50 gf.

Still further, Vickers hardness was measured in order to evaluate acid resistance and alkali resistance after immersing samples into an aqueous solution of 2% citric acid and an aqueous solution of sodium hypochlorite containing an effective chlorine content of 5,000 ppm for 10 days.

The content of a binding portion derived from the binding material in the porous membrane was calculated as a weight ratio converted to an oxide based on the aggregate particles by measuring the quantity of elements in cross-sectional area of the porous membrane after thermally treating with an energy-dispersion type X ray micro analyzer.

EXAMPLE

Examples 1–18 are firstly shown as examples in which a thermal treatment under ambient atmosphere was carried out with an electric furnace for an atmospheric treatment based on the manufacturing method 1.

EXAMPLES 1–5 AND REFERENCE EXAMPLES 1–3

First, the thermal treatment was carried out under the conditions described in Table 1 to prepare a ceramic filter of the present invention, in which a variety of aggregate particles and binding materials described in Table 1 were used.

Results are shown in Table 2.

TABLE 1

| | Specification of raw materials for a porous membrane | | | | | | Conditions for a thermal treatment | |
|---|---|---|---|---|---|---|---|---|
| | aggregate particles | | binding material | | | | | |
| | kind | particle diameter (μm) | kind | state | particle diameter (nm) | addition amount (wt %) | tempera-ture (° C.) | time (hr) |
| Ex 1 | A | 0.7 | T | so | 30 | 30 | 500 | 4 |
| Ex 2 | A | 5 | T | so | 30 | 30 | 500 | 4 |
| Ex 3 | A | 10 | T | so | 30 | 30 | 500 | 4 |
| Ex 4 | Z | 1.0 | T | so | 30 | 30 | 500 | 4 |
| Ex 5 | M | 1.0 | T | p | 30 | 30 | 500 | 4 |
| Rf 1 | A | 0.7 | — | — | — | — | 500 | 4 |
| Rf 1' | A | 0.7 | — | — | — | — | 1350 | |
| Rf 2 | A | 0.7 | S | so | 10 | 30 | 500 | 4 |
| Rf 3 | A | 0.7 | A | so | 20 | 30 | 500 | 4 |

*Symbols in the Table are as follows.
Ex: Example, Rf: Reference Example, A: alumina, Z: zirconia M: mullite, T: titania, S: silica, so: sol, p: fine powder

TABLE 2

| | Micro particles in a membrane (wt %) | Pore diameter (μm) | Water permeability (m$^3$/m$^2$-h) | Vickers hardness | | |
|---|---|---|---|---|---|---|
| | | | | no treatment | after treat-ment by an acid | after treatment by an alkali |
| Ex 1 | 3 | 0.07 | 1.7 | 100 | 105 | 100 |
| Ex 2 | 3 | 0.5 | 5.5 | 80 | 80 | 80 |
| Ex 3 | 3 | 1.0 | 20 | 70 | 70 | 70 |
| Ex 4 | 4 | 0.1 | 1.9 | 90 | 90 | 85 |
| Ex 5 | 3 | 0.1 | 1.9 | 85 | 85 | 85 |
| Rf 1 | — | — | — | 10 | — | — |
| Rf 1' | — | 0.1 | 2.0 | 80 | 80 | 80 |
| Rf 2 | 3 | 0.07 | 1.7 | 110 | 100 | 15 |
| Rf 3 | 3 | 0.07 | 1.7 | 105 | 20 | 20 |

*Symbols in the Table are as follows.
Ex: Example, Rf: Reference Example

As shown in Table 1, one is able to form the ceramic porous membranes having practicable strength only under the conditions in Examples 1–5.

On the contrary, a membrane having sufficient strength cannot be prepared at a condition in the thermal treatment of 500° C. in Reference Example 1 in which a binding material is not added, and a membrane having sufficient strength can be prepared only at a high temperature firing of 1,350° C. as shown in Reference Example 1.

Further, as shown in Reference Examples 2 and 3, there is obtained a result that in case of using a silica sol as a binding material, alkali resistance becomes poor, and in case of using an alumina sol as a binding material, acid resistance and alkali resistance become poor.

Next, a result is shown in which an alumina having the particle diameter of 0.7 μm was used as aggregate particles and a titania sol was used as a binding material for more detailed investigation of how the quality of the membrane is affected by particle diameter of the binding material, addition amount of the binding material, thermal treatment conditions, and the like.

It is to be noted that the conditions (addition amount of a titania sol: 50 wt % as a solid content, particle diameter of a titania sol: 30 nm, and thermal treatment conditions: 500° C.–4 hours) in Example 7 were applied as a standard condition in the following Examples and Reference Examples, and each numerical value in a variety of investigation items was changed.

EXAMPLES 6–9 AND REFERENCE EXAMPLE 4

Investigation about the influence of particle diameter of the titania sol particles to the quality of the porous membrane is conducted. Results are shown in Table 3.

TABLE 3

|       | Particles diameter of a sol (nm) | Micro particles in a membrane (wt %) | Pore diameter (μm) | Water permeability ($m^3/m^2$-h) | Hardness |
|-------|-------|-------|-------|-------|-------|
| Ex 6  | 10    | 9     | 0.08  | 1.7   | 105   |
| Ex 7  | 30    | 10    | 0.07  | 1.6   | 110   |
| Ex 8  | 50    | 11    | 0.08  | 1.7   | 90    |
| Ex 9  | 120   | 13    | 0.09  | 1.8   | 80    |
| Rf 4  | 200   | 15    | 0.09  | 1.8   | 50    |

*Symbols in the Table are as follows.
Ex: Example, Rf: Reference Example

As shown in Table 3, one is able to form the ceramic porous membranes having a practicable strength if the particle diameter of the sol particles is within a range of 10–120 nm.

On the contrary, a membrane having a sufficient strength cannot be prepared in the sol particle diameter of 200 nm as in Reference Example 4.

EXAMPLES 10 AND 11

The influence of addition amount of the titania sol particles to the quality of the porous membrane is investigated. Results are shown in Table 4.

TABLE 4

|       | Addition amount of a sol (wt %) | Micro particles in a membrane (wt %) | Pore diameter (μm) | Water permeability ($m^3/m^2$-h) | Hardness |
|-------|-------|-------|-------|-------|-------|
| Ex 10 | 30    | 3     | 0.07  | 1.7   | 100   |
| Ex 7  | 50    | 10    | 0.07  | 1.6   | 110   |
| Ex 11 | 70    | 15    | 0.07  | 1.5   | 130   |

*Symbols in the Table are as follows.
Ex: Example

As shown in Table 4, one is able to form the ceramic porous membranes having a practicable strength if the addition amount of the sol particles is within a range of 30–70 wt %.

It is to be noted that since the addition amount of the sol particles does not coincide with the amount of micro particles in the membrane, the leakage of the titania sol particles to the substrate side can be suspected.

Figure 2:
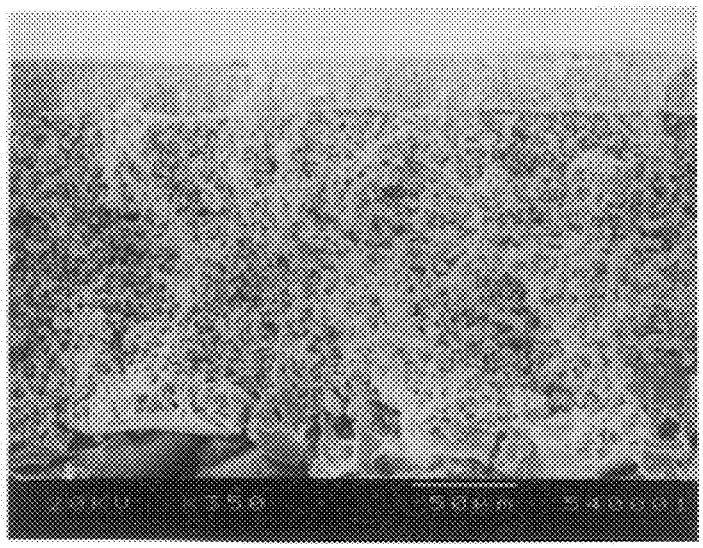
FIG. 2 is a photograph showing a particle structure when viewing a cross-section of a filter of Example 11 of the present invention.
Figure 3:
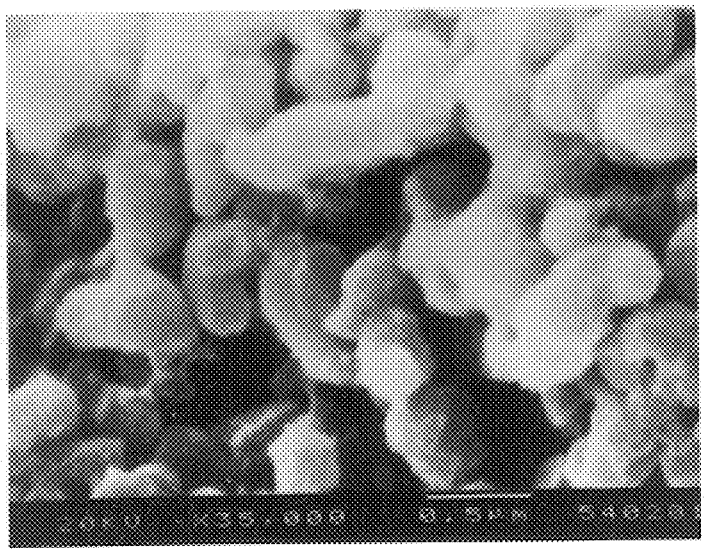
FIG. 3 is a photograph of a particle structure when viewing a cross-section of a porous membrane portion of the filter of Example 11 of the present invention.

FIG. 2 is an SEM photograph showing a sectional view of the porous membrane of Example 11, and FIG. 3 is an enlarged view of the membrane portion thereof. In FIG. 2, a porous membrane having the membrane thickness of 25 μm, and in the FIG. 3, a binding portion by titania particles formed among alumina particles of about 0.7 μm can be observed, respectively.

Further, FIG. 4 is a graph showing a pore distribution of the porous membrane in Example 11. However, it can be identified that pore diameter is precisely controlled at 0.07 μm.

EXAMPLES 12–14 AND REFERENCE EXAMPLES 5 and 6

In order to prevent the invasion of the titania sol particles to the substrate side, a slurry was deposited after water was first soaked into the pores in the substrate, and the influence of addition amount of the titania sol particles to the quality of the porous membrane is again examined.

Results are shown in Table 5.

TABLE 5

|  | Addition amount of a sol (wt %) | Micro particles in a membrane (wt %) | Pore diameter (μm) | Water permeability ($m^3/m^2$-h) | Hardness |
| --- | --- | --- | --- | --- | --- |
| Rf 5 | 0.5 | 0.5 | 0.09 | 1.7 | 55 |
| Ex 12 | 1 | 1 | 0.09 | 1.8 | 75 |
| Ex 13 | 10 | 9 | 0.07 | 1.7 | 110 |
| Ex 14 | 39 | 30 | 0.07 | 1.5 | 150 |
| Rf 6 | 40 | 40 | 0.07 | 1.3 | 160 |

*Symbols in the Table are as follows.
Ex: Example, Rf : Reference Example

As shown in Table 5, one is able to form the ceramic porous membranes having practicable strength if the addition amount of the sol particles is within a range of 1–30 wt %.

The addition amount of the sol particles substantially coincides with the amount of micro particles in the membrane. Accordingly, it can be suggested that a leakage of the sol particles to the substrate side could be prevented by soaking water into the substrate.

On the other hand, as in the Reference Example 5, if the addition amount of the sol particles is adjusted to 0.5 wt %, one is not able to form the ceramic porous membranes having a practicable strength, whereas, as in Reference Example 6, if the addition amount of the sol particles is adjusted to 40 wt %, the amount of micro particles in the membrane attains to 40 wt %, causing a lowering in water permeability.

EXAMPLES 15 AND 16 AND REFERENCE EXAMPLE 7

The influence of temperature of the thermal treatment to the quality of the porous membrane was investigated.

Results are shown in Table 6.

TABLE 6

|  | Temperature in the thermal treatment (° C.) | Micro particles in a membrane (wt %) | Pore diameter (μm) | Water permeability ($m^3/m^2$-h) | Hardness |
| --- | --- | --- | --- | --- | --- |
| Rf 7 | 200 | 10 | 0.07 | 1.7 | 50 |
| Ex 15 | 300 | 10 | 0.07 | 1.7 | 80 |
| Ex 7 | 500 | 10 | 0.07 | 1.6 | 110 |
| Ex 16 | 700 | 10 | 0.07 | 1.7 | 150 |

*Symbols in the Table are as follows.
Ex: Example, Rf : Reference Example

As shown in Table 6, one is able to form the ceramic porous membranes having a practicable strength if the temperature conditions in the thermal treatment is of 300–700° C.

On the contrary, a membrane having sufficient strength cannot be prepared at the conditions in the thermal treatment of 200° C. as in Reference Example 7.

EXAMPLES 17 AND 18

The influence of the period of time for the thermal treatment of the membrane body to the quality of the porous membrane was investigated.

Results are shown in Table 7.

TABLE 7

| | Time in the thermal treatment (hr) | Micro particles in a membrane (wt %) | Pore diameter (μm) | Water permeability (m³/m²-h) | Hardness |
|---|---|---|---|---|---|
| Rf 17 | 1 | 10 | 0.07 | 1.7 | 90 |
| Ex 7 | 4 | 10 | 0.07 | 1.6 | 110 |
| Ex 18 | 10 | 10 | 0.07 | 1.7 | 105 |

*Symbols in the Table are as follows.
Ex: Example, Rf: Reference Example

As shown in Table 7, one is able to form the ceramic porous membranes having practicable strength if the conditions of the period of time for the thermal treatment is of 1–10 hours.

It can be suggested, however, that the strength in the membrane substantially attains a constant value at the period of time for the thermal treatment of 4 hours.

Next, Examples 19–24 are shown as examples in which a thermal treatment under aqueous vapor atmosphere was carried out with an autoclave furnace based on Manufacturing Method 2.

In Examples 19–23, a porous substrate is used in which a slurry composed of alumina particles is deposited inside a tubular porous substrate composed of an alumina having an outer diameter of 10 mm, an inner diameter of 7 mm, a length of 100 mm, a diameter of pore of 10 μm (by the mercury injection method) to form a membrane having a thickness of 100 μm and pore diameter of 0.5 μm (by the Air flow method).

Also, membrane strength was only qualitatively evaluated as described below, in which the following operations were carried out: water pressure of 10 kgf/cm² was applied from the substrate side, and water was permeated toward the membrane side. After the operation was repeated 100 times, the diameter distribution of the pores and water permeability were measured. In the case where 20% or more was changed compared with that of before examination, or a defect was found out in the membrane, it was considered to be a failure.

EXAMPLES 19–23 AND REFERENCE EXAMPLE 8

First, a thermal treatment was effected using a variety of aggregate particles and binding materials described in Table 8 and according to conditions described in Table 8 to prepare a ceramic filter of the present invention. Results are shown in Table 9.

TABLE 8

Specification of raw materials for a porous membrane

| | aggregate particles | | binding material | | | Conditions for a thermal treatment | | |
|---|---|---|---|---|---|---|---|---|
| | kind | particle diameter (μm) | kind | particle diameter (nm) | addition amount (wt %) | temperature (° C.) | steam pressure (atm) | time (hr) |
| Ex 19 | A | 0.7 | T | 10 | 10 | 180 | 10 | 10 |
| Ex 20 | A | 0.7 | T | 30 | 10 | 200 | 15 | 10 |
| Ex 21 | A | 0.7 | T | 70 | 10 | 250 | 38 | 10 |
| Ex 22 | A | 0.3 | T | 40 | 5 | 180 | 10 | 10 |
| Ex 23 | SP | 1.0 | T | 30 | 15 | 200 | 15 | 10 |
| Ex 24 | A | 60 | T | 30 | 20 | 200 | 15 | 15 |
| Rf 8 | A | 0.7 | — | — | — | 1350 | | 1 |
| Rf 9 | A | 60 | — | — | — | 1525 | | 1 |

*Symbols in the Table are as follows.
Ex: Example, Rf: Reference Example, A: alumina, T: titania,

TABLE 9

| | Pore diameter (μm) | Water permeability (m³/m²-h) | Test for the strength of a membrane |
|---|---|---|---|
| Ex 19 | 0.1 | 1.8 | ○ |
| Ex 20 | 0.1 | 1.7 | ○ |
| Ex 21 | 0.1 | 1.6 | ○ |
| Ex 22 | 0.05 | 0.8 | ○ |
| Ex 23 | 0.2 | 3.3 | ○ |
| Rf 8 | 0.1 | 2 | ○ |

Ex: Example, Rf: Reference Example

It is able to form the ceramic porous membranes having practicable strength if the conditions is that in Examples 19–23 shown in Table 8.

On the contrary, in Reference Example 8 in which a binding material is not used, a membrane having a sufficient strength cannot be prepared at the condition in the thermal treatment of 300° C., and a membrane having sufficient strength can be prepared only at the high temperature condition in the thermal treatment of 1,350° C.

EXAMPLE 24 AND REFERENCE EXAMPLE 9

In the Example 24, a thermal treatment was effected using alumina particles having a large diameter as aggregate particles according to conditions described in Table 8 to prepare a porous substrate having a relatively large particle diameter.

Specifically, a titania sol liquid having the diameter of 30 nm was added into alumina particles having the diameter of 50 μm in 20% by weight based on the solid content, and water and a methylcellulose as an organic binder were added thereto to prepare a mixture. A kneaded product was prepared with a kneader, followed by molding a tube having an outer diameter of 10 mm, an inner diameter of 7 mm, and a length of 300 mm, and by thermally treating. Results are shown in Table 10.

TABLE 10

| | Pore diameter (μm) | Water permeability (m³/m²-h) | Test for the strength of a membrane |
|---|---|---|---|
| Ex 24 | 8 | 120 | ○ |
| Rf 9 | 8 | 120 | ○ |

*Symbols in the Table are as follows.
Ex: Example, Rf: Reference Example

It is able to form a porous substrate having practicable strength only at the conditions in the Example 24.

That is, according to the manufacturing method, not only a porous membrane, but also a porous substrate can be prepared.

On the contrary, in the Reference Example 9 in which a binding material is not used, a substrate having sufficient strength cannot be prepared at the condition (200° C.) in the thermal treatment as in the Example 10, and a substrate having sufficient strength can be prepared only at the high temperature of 1525° C.

According to the present invention, there can become prepared a porous membrane and a ceramic filter having a practicable strength and corrosion resistance by a temperature condition where refractory facilities are not required.

While the invention has been described in detail and with reference to specific Examples thereof, it will be apparent to one skilled in the art that various changes and modifications can be made therein without departing from the spirit and scope thereof.

What is claimed is:

1. A ceramic porous membrane comprising aggregate particles comprising a member selected from the group consisting of alumina, titania, mullite, zirconia, silica, spinel, and mixtures thereof and having an average particle diameter in the range of 0.1 to 10 μm, said aggregate particles being bound together by binder particles of a titania having an average particle diameter no more than ⅕ of the average particle diameter of said aggregate particles and the quantity of said binder particles being in the range of 1 to 30 percent by weight of said aggregate particles.

2. The ceramic porous membrane of claim 1, wherein the average particle diameter of said aggregate particles is in the range of 0.1 to 3 μm.

3. The ceramic porous membrane of claim 1, wherein said aggregate particles comprise an α-alumina.

4. A ceramic filter comprising a porous substrate having deposited on a surface thereof a ceramic porous membrane comprising aggregate particles comprising a member selected from the group consisting of alumina, titania, mullite, zirconia, silica, spinel, and mixtures thereof and having an average particle diameter in the range of 0.1 to 10 μm, said aggregate particles being bound together by binder particles of a titania having an average particle diameter no more than ⅕ of the average particle diameter of said aggregate particles and the quantity of said binder particles being in the range of 1 to 30 percent by weight of said aggregate particles.

5. The ceramic filter of claim 4, wherein the average particle diameter of said aggregate particles is in the range of 0.1 to 3 μm.

6. The ceramic filter of claim 4, wherein said aggregate particles comprise an α-alumina.

* * * * *